(12) United States Patent
Kim et al.

(10) Patent No.: US 8,282,260 B2
(45) Date of Patent: Oct. 9, 2012

(54) DISPLAY APPARATUS

(75) Inventors: Heu-Gon Kim, Yongin-si (KR); Byung-Seo Yoon, Incheon (KR); Taek-Sun Shin, Asan-si (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 221 days.

(21) Appl. No.: 12/562,587

(22) Filed: Sep. 18, 2009

(65) Prior Publication Data

US 2010/0149788 A1    Jun. 17, 2010

(30) Foreign Application Priority Data

Dec. 16, 2008  (KR) .................. 10-2008-0127919

(51) Int. Cl.
*F21V 7/04* (2006.01)
(52) U.S. Cl. ...... 362/616; 362/615; 362/97.1; 362/97.2; 362/628; 362/617
(58) Field of Classification Search .................. 362/616, 362/97.1–97.2, 615, 617, 628, 618–620
See application file for complete search history.

(56) References Cited

U.S. PATENT DOCUMENTS

| | | | |
|---|---|---|---|
| 7,311,431 B2 * | 12/2007 | Chew et al. | 362/613 |
| 2001/0053072 A1 * | 12/2001 | Takemoto | 362/31 |
| 2009/0316074 A1 * | 12/2009 | Tomiyoshi | 349/65 |

FOREIGN PATENT DOCUMENTS

WO    WO 2008050509 A1 *  5/2008

* cited by examiner

*Primary Examiner* — Robert May
(74) *Attorney, Agent, or Firm* — Cantor Colburn LLP

(57) ABSTRACT

A display apparatus includes a display panel, a light source and a plurality of a light guiding plate. The LGP includes light incident, counter, light emitting and rear surfaces. The counter and rear surfaces are respectively opposite to the light incident and light emitting surfaces. The light emitting surface includes an ineffective light emitting area making contact with the light incident surface and an effective light emitting area connecting the ineffective light emitting area with the counter surface. The counter surface of a first light guiding plate is disposed overlapping the light incident surface of a second light guiding plate along a first direction, so that the rear surface partially overlaps with the effective light emitting area of the second light guiding plate, and the light guiding plates collectively form a light guiding plate array along the first direction.

19 Claims, 10 Drawing Sheets

DISPLAY APPARATUS

This application claims priority to Korean Patent Application No. 2008-127919, filed on Dec. 16, 2008, and all the benefits accruing therefrom under 35 U.S.C. §119, the contents of which are herein incorporated herein by reference in their entirety.

BACKGROUND OF THE INVENTION

1. Field of the Invention

The present invention relates to a display apparatus. More particularly, the present invention relates to a display apparatus including a plurality of light guiding plates and having a large size.

2. Description of the Related Art

A flat panel display apparatus includes a light source module providing light to a display panel which displays images using the light. The light source module is disposed beneath a rear surface of the display panel.

The light source module is classified into an edge illumination type backlight unit ("BLU") and a direct illumination type BLU. In the edge illumination type BLU, a light source is disposed at a side of a light guiding plate ("LGP") facing the rear surface of the display panel, so that the edge illumination type BLU has an advantage in decreasing thickness of the display apparatus. In the direct illumination type BLU, a plurality of lamps or light emitting diodes are disposed directly under and overlapping the display panel, so that an amount of the light is advantageously large. Thus, the direct illumination type BLU is often chosen for a display apparatus having a large size.

Slimming the thickness and enlarging the size of the display apparatus have been technically important in the flat panel display apparatus. To do so, the BLU needs to be slimmed and have the large and slim size. In addition, the BLU needs to have highly uniform luminance.

BRIEF SUMMARY OF THE INVENTION

Since a direct illumination type backlight unit ("BLU") includes a plurality of lamps or light emitting diodes disposed directly under and overlapping the display panel, there may be technical difficulties in manufacturing a relatively large, cost-effective and slim display apparatus including the BLU. For example, in the direct illumination type BLU, the light source needs to be spaced apart from an optical part, such as a light diffusion plate, by at least a predetermined distance to obtain the uniform luminance no less than reference luminance, which undesirably increases an overall thickness of the BLU. In addition, the direct illumination type BLU includes a relatively large number of light sources, such as a lamp, and additional components, such as a light guide plate ("LGP"), which undesirably increases cost and power consumption of the display apparatus.

An exemplary embodiment of the present invention provides a display apparatus having simple structure and high luminance uniformity, so that the display apparatus may have a relatively large size.

According to an exemplary embodiment of the present invention, a display apparatus includes a display panel, a light source and a plurality of light guiding plates ("LGPs"). The display panel displays images. The light source emits light through which the images are displayed. The LGP includes a light incident surface, a counter surface, a light emitting surface and a rear surface. The light incident surface faces the light source and the light is incident on the light incident surface. The counter surface is opposite to the light incident surface. The light emitting surface faces a rear surface of the display panel, and includes an ineffective light emitting area making contact with the light incident surface and an effective emitting area connecting the ineffective light emitting area with the counter surface. The rear surface is opposite to the light emitting area. The counter surface of a first LGP is disposed overlapping the light incident surface of a second LGP adjacent to the first LGP along a first direction, so that the rear surface of the first LGP partially overlaps with the effective light emitting area of the second LGP, and the LGPs collectively define an LGP array along the first direction.

In an exemplary embodiment, the rear surface may include first, second and third continuous areas. The first area extends from the ineffective light emitting area and includes the effective light emitting area in which the LGPs overlap with each other, and a light diffusion pattern is disposed in the first area. The second area extends from the counter surface to the effective light emitting area in which the LGPs overlap with each other, and the light diffusion pattern is disposed in the second area. The third area connects the first area with the second area, the LGPs do not overlap in the third area, the light diffusion pattern is disposed in the third area, and a density of the light diffusion pattern in the third area is higher than that in the first and second areas.

A light emitting profile of the LGP array may have substantially uniform luminance in the effective emitting area. The light emitting profile of the LGP array may have the luminance increased to reach the uniform luminance in the first area of a first end portion of the LGP array as a distance from the light incident surface at the first end portion is increased. The light emitting profile of the LGP array may have the luminance decreased from the uniform luminance in the second area of a second end portion of the LGP array as a distance from the counter surface at the second end portion is decreased. A single LGP is disposed in the first area at the first end portion of the LGP array, and the single LGP is disposed in the second area at the second end portion of the LGP array opposite to the first end portion.

According to an exemplary embodiment of the present invention, adjacent LGPs partially overlap with each other and a plurality of the LGPs is disposed under (e.g., overlapping) the display panel, so that a display apparatus having an ultra large size is easily manufactured. In addition, the display apparatus has a relatively highly uniform luminance and a simple LGP array structure, so that manufacturing cost may be decreased. Further, the LGP forms a surface light, so that a distance between an optical sheet and the LGP may be decreased and the thickness of the BLU and the display apparatus may be decreased.

BRIEF DESCRIPTION OF THE DRAWINGS

The above and other features and advantages of the present disclosure of invention will become more apparent by describing in detailed exemplary embodiments thereof with reference to the accompanying drawings, in which.

DETAILED DESCRIPTION OF THE INVENTION

Figure 1:
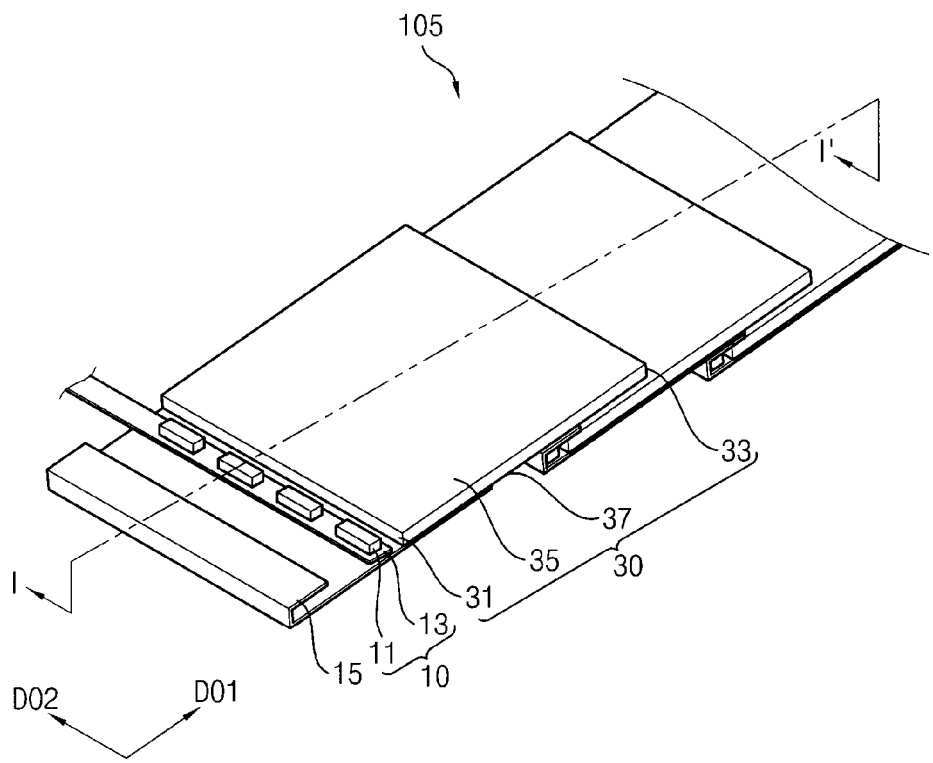
FIG. 1 is an exploded perspective view illustrating an exemplary embodiment of a display apparatus according to the present invention.

Although the present disclosure is described more fully hereinafter with reference to the accompanying drawings, the underlying concepts may, however, be embodied in many different forms and should not be construed as limited to the exemplary embodiments set forth herein. Rather, these exemplary embodiments are provided so that this disclosure will be thorough and complete, and will fully convey its teachings to those skilled in the pertinent art. In the drawings, the sizes and relative sizes of layers and regions may be exaggerated for sake of clarity.

It will be understood that when an element or layer is referred to as being "on" or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein interpreted accordingly.

The terminology used herein is for the purpose of describing particular exemplary embodiments and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments herein should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present invention.

Unless otherwise defined, all terms (including technical and scientific terms) used herein have the same meaning as commonly understood by one of ordinary skill in the pertinent art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure of invention will be explained in detail with reference to the accompanying drawings.

Figure 2:
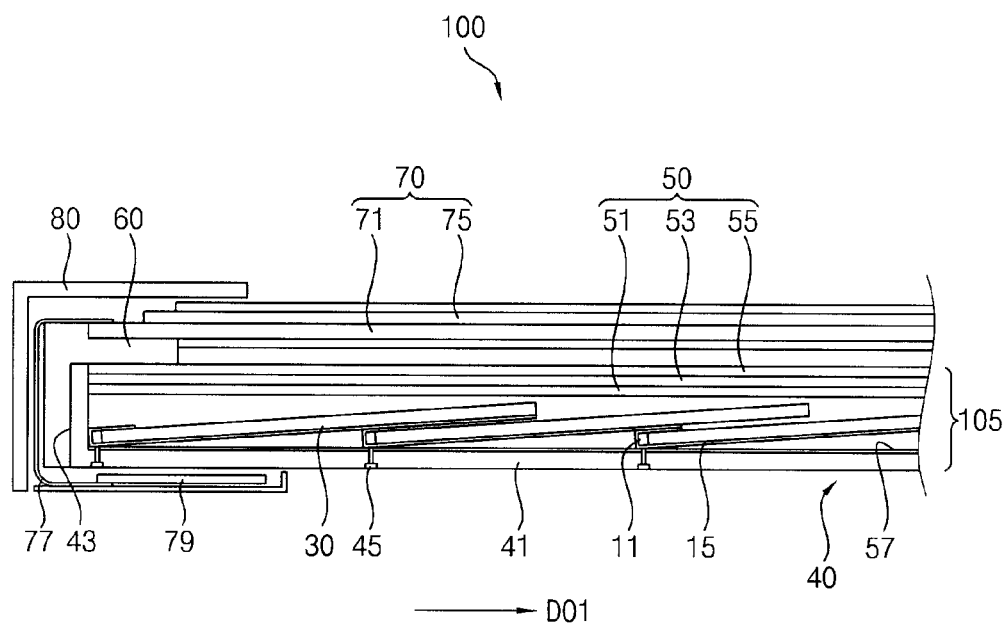
FIG. 2 is a cross-sectional view taken along line I-I' in FIG. 1.

FIG. 1 is an exploded perspective view illustrating an exemplary embodiment of a display apparatus 100 according to the present invention. FIG. 2 is a cross-sectional view taken along line I-I' in FIG. 1.

Referring to FIGS. 1 and 2, the display apparatus 100 includes a light source 10, a plurality of a light guiding plate ("LGP") 30, a plurality of optical sheets 50 and a display panel 70. A module which includes the light source 10 and the LGPs 30, and is disposed under and overlapping the display panel 70 is referred to as a backlight unit ("BLU") 105.

The light source 10 generates and emits light. The LGP 30 guides the light and emits the light from the LGP 30 substantially as a planar or surface light. The LGP 30 is a single, continuous and indivisible member of the BLU 105. The optical sheets 50 increase luminance uniformity and front luminance of the surface light emitted by the LGP 30 in a viewing direction of the display apparatus 100. The display panel 70 displays images using the light provided by the optical sheets 50. In the illustrated embodiment, the light source 10 includes a point light source, such as a light emitting diode ("LED"), 11 and a power transmitting film 13.

In one exemplary embodiment, the LED 11 may include a blue chip emitting blue light and a fluorescent substance converting the blue light into white light. Alternatively, the LED 11 may include blue, green and red chips respectively emitting blue, green and red light. The blue light, the green light and the red light may be mixed inside of the LGP 30 and may be emitted from the LGP 30 as white light.

In an exemplary embodiment, the power transmitting film 13 includes a flexible base film and power lines disposed on the base film. A plurality of the LED 11 is mounted on the power transmitting film 13 and receives driving power through the power transmitting film 13.

Figure 3:
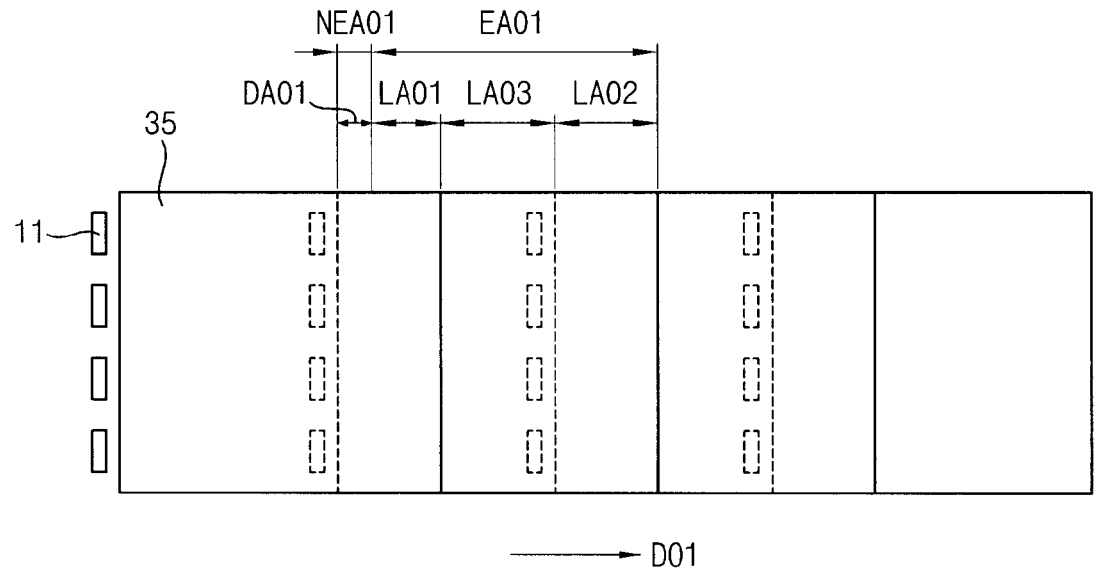
FIG. 3 is a plan view illustrating an exemplary embodiment of a backlight unit ("BLU") in FIG. 1.

FIG. 3 is a plan view illustrating an exemplary embodiment of a backlight unit ("BLU") 105 in FIG. 1.

Referring to FIGS. 1, 2 and 3, the LGP 30 has a substantially flat (e.g., planar) plate shape having a substantially uniform thickness taken in a direction substantially perpendicular to the BLU 105. In one exemplary embodiment, the LGP 30 is formed by a molding process using polymer resin having a relatively high thermal resistance, high chemical resistance and high mechanical strength. The polymer resin material may include, but is not limited to, polymethylmethacrylate, polyamide, polyimide, polypropylene and polyurethane, etc.

The LGP 30 includes a light incident surface 31, a counter surface 33 disposed opposite to and facing the light incident surface 31, a light emitting surface 35 disposed facing and overlapping the display panel 70, and a rear surface 37 disposed opposite to and facing the light emitting surface 35. The light incident surface 31 and the counter surface 33 connect the light emitting surface 35 with the rear surface 37 which are disposed opposite to each other. The LGP 30 includes additional side surfaces to the light incident surface 31 and the counter surface 33, and further connects the light emitting surface 35 with the rear surface 37. The LED 11 is disposed on the light incident surface 31, such as being disposed directly adjacent to the light incident surface 31.

The light emitting surface 35 includes an effective light emitting area EA01 and ineffective light emitting area NEA01. The ineffective light emitting area NEA01 is disposed directly adjacent to and may make contact with an edge of the light emitting surface 35 which is common with an edge of the light incident surface 31. In the plan view, the ineffective light emitting area NEA01 may have a substantially uniform width taken in a direction substantially perpendicular to the edge of the light emitting surface 35 which is common with an edge of the light incident surface 31. The effective light emitting area EA01 may connect the ineffective light emitting area NEA01 with the counter surface 33. The effective light emitting area EA01 is disposed directly adjacent to and may make contact with an edge of the light emitting surface 35 which is common with an edge of the counter surface 33.

In the illustrated exemplary embodiment, a thickness of the light incident surface 31 taken in a direction substantially perpendicular to the plan view of the BLU 105 is larger than a thickness of the LED 11 taken in the same direction. In one exemplary embodiment, the LGP 30 may be a rigid plate, such as having a substantially rectilinear shape. Alternatively, the thickness of the light incident surface 31 may be smaller than that of the LED 11, such as to manufacture a relatively slim LGP 30. Alternatively, a light guide film may be used in substitution for the LGP 30 and for generating surface light. The light guide film may be formed using flexible resin. The light guide film may have a thickness that is substantially thinner than that of the LED 11.

In the illustrated exemplary embodiment, the plurality of LGPs 30 is disposed partially overlapping with each other along a first direction D01. An overlapping arrangement is indicated by the light incident surface 31 of the second to third LGP 30 in FIG. 3 as a dotted line. An inclination shape of the LGP 30 in FIGS. 1 and 2 is exaggerated for explanation. In an exemplary embodiment, the LGP 30 may be very slim and may be proportionally longer along the first direction D01, than the embodiment shown in FIGS. 1, 2 and 3. Although the LGPs 30 partially overlap with each other, a slope of the light emitting surface 35 of the LGP 30 may be negligible and the light emitting surface 35 may be essentially horizontally disposed (e.g., substantially parallel with a plane of the BLU 105).

The light generated from the LED 11 is emitted substantially straight towards the light incident surface 31 of the LGP 30, such as being emitted directly to the light incident surface 31 of the LGP 30. The light incident into the LGP 30 through the light incident surface 31 may initially go straight by a predetermined distance, and then the light is uniformly diffused and scattered by the LGP 30.

Hot spots may occur in the ineffective light emitting area NEA01. The hot spots correspond (e.g., in relative dimension and/or positional location) to the LEDs 11, so that the hot spots having a luminance relatively higher than that in adjacent areas of the LGP 30 are generated in the ineffective light emitting area NEA01. In a direction substantially parallel to the light incident surface 31, a luminance difference between an area corresponding to the LED 11, and an area corresponding to a space between the LEDs 11 adjacent to each other, is relatively large in the ineffective light emitting area NEA01.

Accordingly, the ineffective light emitting area NEA01 is defined as an area having luminance uniformity no more than reference luminance uniformity. The light passing through the ineffective light emitting area NEA01 is not appropriate to be used for displaying the images of the display panel 70, and the ineffective light emitting area NEA01 is excluded as a light extraction area. The light inside of the LGP 30 is sufficiently diffused and scattered, so that the effective light emitting area EA01 is defined as an area having the luminance uniformity no less than the reference luminance uniformity.

The ineffective light emitting area NEA01 is covered with a reflection cover described below. The width of the ineffective light emitting area NEA01 is independent from a width of the effective light emitting area EA01 along the first direction D01. The ineffective light emitting area NEA01 and the effective light emitting area EA01 may collectively define a whole area of the light emitting surface 35.

The width of the ineffective light emitting area NEA01 may be changed according to a distance between the LEDs 11 adjacent to each other along a direction substantially perpendicular to the first direction D01, or between the hot spots adjacent to each other. In one exemplary embodiment, when the distance between the LEDs 11 adjacent to each other is indicated as Lp, the ineffective light emitting area NEA01 may have the width taken in the first direction D01 in a range between about (½)Lp to about 2 Lp to decrease a defective effect due to the hot spots. In the illustrated exemplary embodiment, the distance between the LEDs 11 adjacent to each other may be in the range between about 5 millimeters (mm) to about 6 millimeters (mm), and the width of the ineffective light emitting area NEA01 may be in the range between about 3 mm to about 6 mm.

The width of the effective light emitting area EA01 may be changed considering a target luminance which may be obtained by the BLU 105. In the illustrated exemplary embodiment, the width in the first direction D01 of the effective light emitting area EA01 may be determined so that the target luminance may be obtained from the amount of the light emitted from a single LED module having the LEDs 11 arranged in a line substantially parallel with the light incident surface 31. As the amount of the light emitted from the LEDs 11 and the light passing through the optical sheets 50 with the high luminance and transmittance of the display panel 70 are increased, the width of the effective light emitting area EA01 may be respectively increased.

Figure 4:
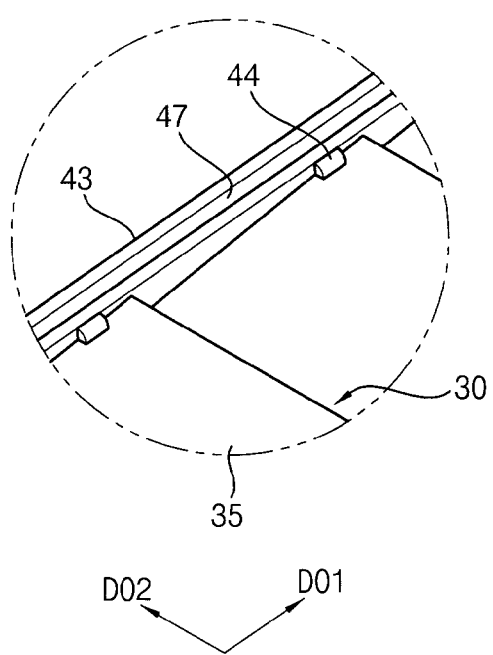
FIG. 4 is a perspective view illustrating an exemplary embodiment of an inner surface of a side wall of a receiving container in FIG. 2.

FIG. 4 is a perspective view illustrating an exemplary embodiment of an inner surface of a side wall of a receiving container 40 in FIG. 2.

Referring to FIGS. 2 and 4, the display apparatus 100 further includes the receiving container 40 and a reflection cover 15.

The receiving container 40 receives the light source 10 and the plurality of the LGPs 30. The receiving container 40 includes a bottom plate 41 and a side wall 43. The bottom plate 41 may be a substantially planar member disposed at a rear of the BLU 105. The receiving container 40 may include a plurality of the side wall 43 each extending from the bottom plate 41 to define a receiving area, in which the light source 10 and the plurality of the LGPs 30 are disposed. The LGPs 30 are disposed on the bottom plate 41, and partially overlap with each other in the plan view. Since the LGPs 30 are disposed on the bottom plate 41 and partially overlap with each other in the receiving container 40, securely fixing the LGP 30 to the receiving container 40 is critical in the display apparatus 100.

In the illustrated exemplary embodiment, a plurality of a fixing protrusion 44 is disposed on an inner surface of the side wall 43 to fix the LGP 30 to the receiving container 40. The fixing protrusions 44 may extend from the side wall 43 along a second direction D02 substantially perpendicular to the first direction D01. A lower surface of each of the fixing protrusions 44 may contact the light emitting surface 35 of each respective LGP 30.

The fixing protrusion 44 includes an inclined surface (e.g., the lower surface) inclined with respect to the bottom plate 41. The LGPs 30 may slide along the inclined surface of the fixing protrusion 44 and are disposed between the fixing protrusions 44 and the bottom plate 41, so that the LGPs 30 are strongly fixed to the receiving container 40. Advantageously, movement along a vertical direction, which is substantially perpendicular to and orthogonal to both the first and second directions D01 and D02, of the LGPs 30 is reduced or effectively prevented.

Each of the LGPs 30 is disposed between the lower surface of a respective fixing protrusion 44 and an upper surface of the bottom plate 41 of the receiving container 40. The LGPs 30 are slidably disposed between the fixing protrusion 44 and an upper surface of the bottom plate 41 of the receiving container 40, such that the LGPs 30 may be retained between the fixing protrusion 44 and the receiving container 40.

An end portion of the LGP 30, such as of the light incident surface 31, is inserted into the reflection cover 15. The reflection cover 15 partially surrounds the LEDs 11, and extends to the ineffective light emitting area NEA01 of the light emitting surface 35 and the rear surface 37 of the LGP 30. In an exemplary embodiment, the reflection cover 15 may include a relatively rigid material so that a shape of the reflection cover 15 may be maintained, and may not be deformed. Alternatively, the reflection cover 15 may include a relatively flexible material, and be disposed as a flexible sheet type member. The reflection cover 15 is a single, continuous and indivisible member of the BLU 105.

A first distal end of the reflection cover 15 overlaps the ineffective light emitting area NEA01 of the light emitting surface 35 of the LGP 30. A second distal end of the reflection cover 15 overlaps a portion of the rear surface 37 of the LGP 30. The second distal end of the reflection cover 15 may extend substantially an entire width of the LGP 30 in the first direction D01, or may only extend a portion of the width of the LGP 30 in the first direction D01. The reflection cover 15 may overlap an entire of the length of the LGP 30 in the second direction D02.

The power transmitting film 13 may be disposed directly on the reflection cover 15, and be disposed between the LEDs 11 and the reflection cover 15.

Referring to FIGS. 1 and 2 again, a plurality of the reflection covers 15 is combined with the bottom plate 41 with a fastening member, such as screws 45. The end portion of the LGP 30 (e.g., the light incident surface 31) is inserted into the reflection cover 15, so that the LGP 30 is fixed to the receiving container 40. In one exemplary embodiment, a stopper (not shown) may be disposed on an inner surface of the reflection cover 15, so that movement of the LGPs 30 along a horizontal direction, such as the first direction D01 which is substantially perpendicular to the vertical direction, can be reduced or effectively prevented. As described above, the inclination shape of the LGP 30 with respect to the bottom plate 41 in FIGS. 1 and 2 is exaggerated for the explanation only. Thus, the reflection covers 15 of the illustrated exemplary embodiment substantially make contact with an upper surface of the bottom plate 41.

Figure 5:
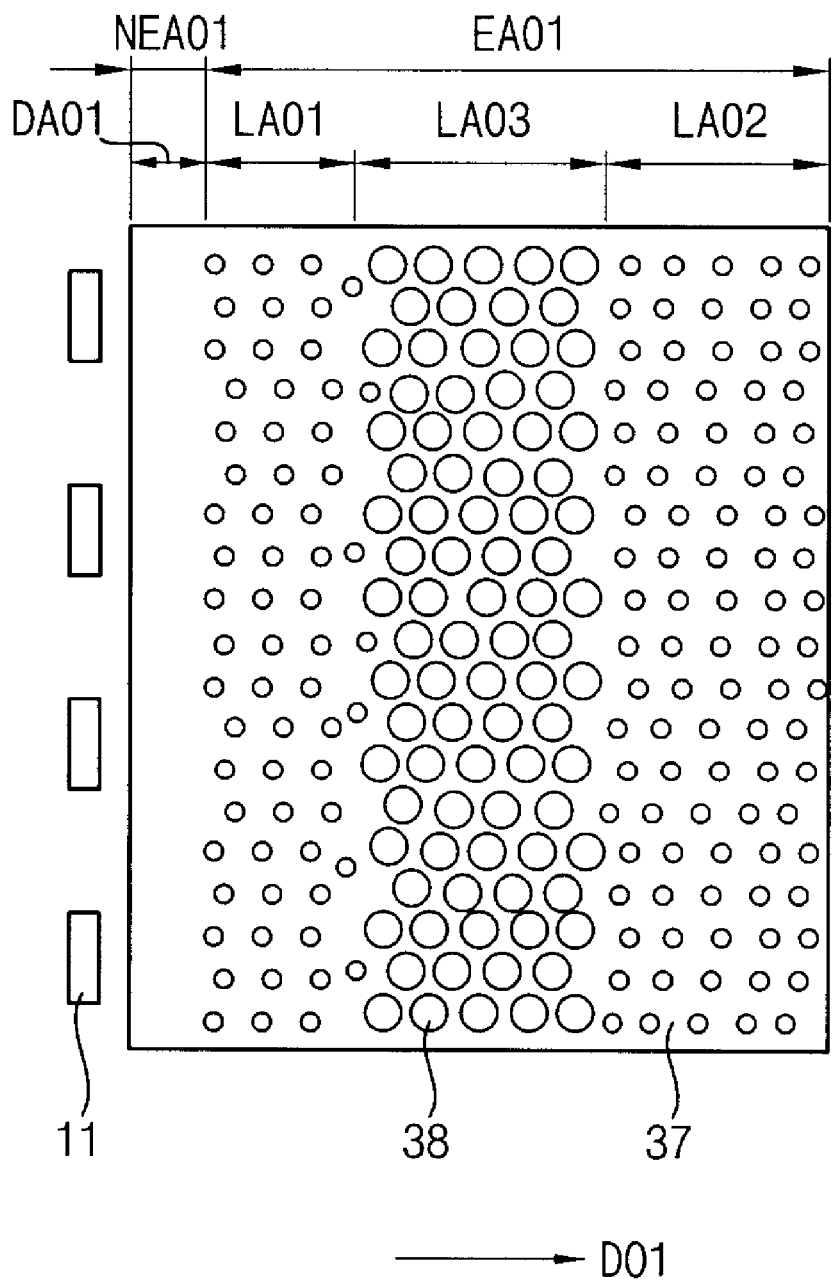
FIG. 5 is a plan view illustrating an exemplary embodiment of a rear surface of a light guiding plate ("LGP")

FIG. 5 is a plan view illustrating an exemplary embodiment of the rear surface 37 of the LGP 30.

Referring to FIG. 5, light diffusing pattern 38 is disposed on the rear surface 37 of the LGP 30. In one exemplary embodiment, the light diffusing pattern 38 may include a dot 38 printed on the rear surface 37 of the LGP 30. Alternatively, light diffusing pattern 38 may include a groove extending from the rear surface 37 to an inner area of the LGP 30 or a protrusion protruding outwardly from the rear surface 37, and having a pyramid shape formed on the rear surface 37. The light diffused and scattered inside of the LGP 30 is irregularly reflected on the rear surface 37, so that most of the light passes through the light emitting surface 35. The light may partially leak through the rear surface 37. The leaked light reflects from the reflection cover 15, and a reflection sheet 57 (FIG. 2), and is incident into the rear surface 37 of the LGP 30 again.

The printed dots 38 are disposed on the rear surface 37 of the LGP 30. In one exemplary embodiment, the printed dot 38 may be formed by printing an ink mixture including white ink and light diffusion substance on the rear surface 37 of the LGP 30.

As illustrated in FIGS. 2 and 3, the LGPs 30 are arranged substantially linearly in the first direction D01, to partially overlap with each other. In one exemplary embodiment, an end portion of a first LGP 30 (e.g., the counter surface 33) is disposed on and overlapping the light emitting surface 35 of a second LGP 30 adjacent to the first LGP 30 along the first direction D01, so that a portion of the first LGP 30 partially overlaps with the effective light emitting area EA01 of the second LGP 30 in the plan view. Referring to FIG. 3, the rear surface 37 of the first LGP 30 is divided into first, second and third continuous areas LA01, LA02 and LA03 according to an overlap with the second LGP 30.

Referring to FIG. 2, the first (e.g., leftmost) LGP 30 is considered an "upper" LGP with respect to a second (e.g., middle) LGP 30, since a portion of the first LGP 30 overlapping the second LGP 30 is disposed further from the bottom portion 41 of the receiving container 40 than the second LGP 30, and above the second LGP 30. A third (e.g., rightmost) LGP 30 is considered a "lower" LGP with respect to the second LGP 30, since a portion of the third LGP 30 overlapping the second LGP 30 is disposed closer to the bottom portion 41 of the receiving container than the second LGP 30, and below the second LGP 30. In FIG. 3, four overlapping LGPs 30 are illustrated, and areas of the second LGP 30 are detailed below.

Referring to FIGS. 3 and 5, the first area LA01 of the second LGP 30 corresponds to a rear surface 37 of a lower LGP except for the ineffective light emitting area NEA01 of the lower LGP, among the areas in which adjacent LGPs 30 overlap with each other. The second area LA02 of the second LTP 30 corresponds to a rear surface of an upper LGP except for the ineffective light emitting area NEA01 of the lower LGP among the areas in which adjacent LGPs 30 overlap with each other. The third area LA03 of the second LGP 30 corresponds to an area connecting the first area LA01 with the second area LA02. The first, second and third areas LA01, LA02 and LA03 may collective define an entire of a planar area of the second LGP 30, in the plan view.

As illustrated in FIG. 3, the first area LA01 is spaced apart from an edge of the light incident surface 31. An area between the first area and the edge of the light incident surface 31 is referred to as a dead area DA01 which may have hot spots due to the LED 11. The second area LA02 makes contact with an edge of the counter surface 33 and has a substantially uniform width in the first direction D01. The first area LA01 and the second area LA02 may also have a substantially uniform width in the first direction D01.

When the LGPs 30 arranged along the first direction D01 are defined as an LGP 30 array, a single LGP 30 is disposed in (e.g., overlaps) the first area LA01 which includes a first end portion of the LGP array, and the single LGP 30 is disposed in (e.g., overlaps) the second area LA02 which includes a second end portion of the LGP array opposite to the first end portion. A single LGP 30 indicates that no portion of another LGP 30 overlaps the single LGP 30. The LGP 30 of left end portion of the LGP 30 array (e.g., the leftmost LGP 30 in FIG. 3) includes the first area LA01 which does not overlap with an adjacent LGP 30 disposed to the right, and the LGP 30 of right end portion of the LGP 30 array (e.g., the rightmost LGP 30 in FIG. 3) includes the second area LA02 which does not overlap with an adjacent LGP 30 disposed to the left. The light emitting surface 35 may have a relatively lower luminance in the first are LA01 and the second area LA02 of the left and right end portions of the LGP 30 array, respectively, than in the first area LA01 and the second areas LA02 in the overlapped areas of the LGP 30 array.

In the illustrated exemplary embodiment, the printed dots 38 are irregularly disposed on the rear surface 37 of the LGP 30 as illustrated in FIG. 5. The printed dots 38 have a first density, a second density and a third density in the first area LA01, the second area LA02 and the third area LA03, respectively. The third density, at an area where there is no overlapping of adjacent LGPs 30, may be higher than the first and second densities, at areas where there is overlapping of adjacent LGPs 30. The density may be defined as a planar area of the LGP 30 occupied by the printed dots 38. An increase in the density may include disposing more of a uniformly sized printed dot 38 in an area, or may include disposing larger sized printed dots 38 in the area.

As the density of the printed dots 38 is increased, the luminance of the light emitting surface 35 of the LGP 30 is increased. Advantageously, the luminance of the light emitting surface 35 of the LGP 30 is higher in the third area LA03 than in the first and second areas LA01 and LA02. As a distance from the light incident surface 31 is increased, the amount of the light from the LEDs 11 is decreased. When the second density is higher than the first density, light profile emitting from the light emitting area may be symmetrically formed between the first and second areas LA01 and LA02 with respect to the third area LA03.

A ratio of the width between two areas selected from the first, second and third areas LA01, LA02 and LA03 changes according to the width of the effective light emitting area EA01 including the first, second and third areas LA01, LA02 and LA03. In one exemplary embodiment, the first area LA01 has substantially the same width as the second area LA02, where the widths are taken in the first direction D01. Alternatively, the second area LA02 may have a smaller width than the first area LA01. The luminance sharply changes in the first area LA01. When the width of the first area LA01 is too small, the first area LA01 may have difficulty in forming the luminance uniformly over the LGP 30 while including the light diffusion pattern 38 in the first area LA01.

However, when the width of the LGP 30 is decreased, the LGP 30 may have advantages that a cost and a thickness of the BLU 105 are decreased. The widths of the first and second areas LA01 and LA02 are determined by considering these advantages and the uniform luminance of the LGP 30. In one exemplary embodiment, the first and second areas LA01 and LA02 each have the widths in the range between about 20 mm to about 30 mm. When the light diffusion pattern 38 has remarkably advanced proprieties, the widths of the first and second areas LA01 and LA02 may be decreased.

Figure 6:
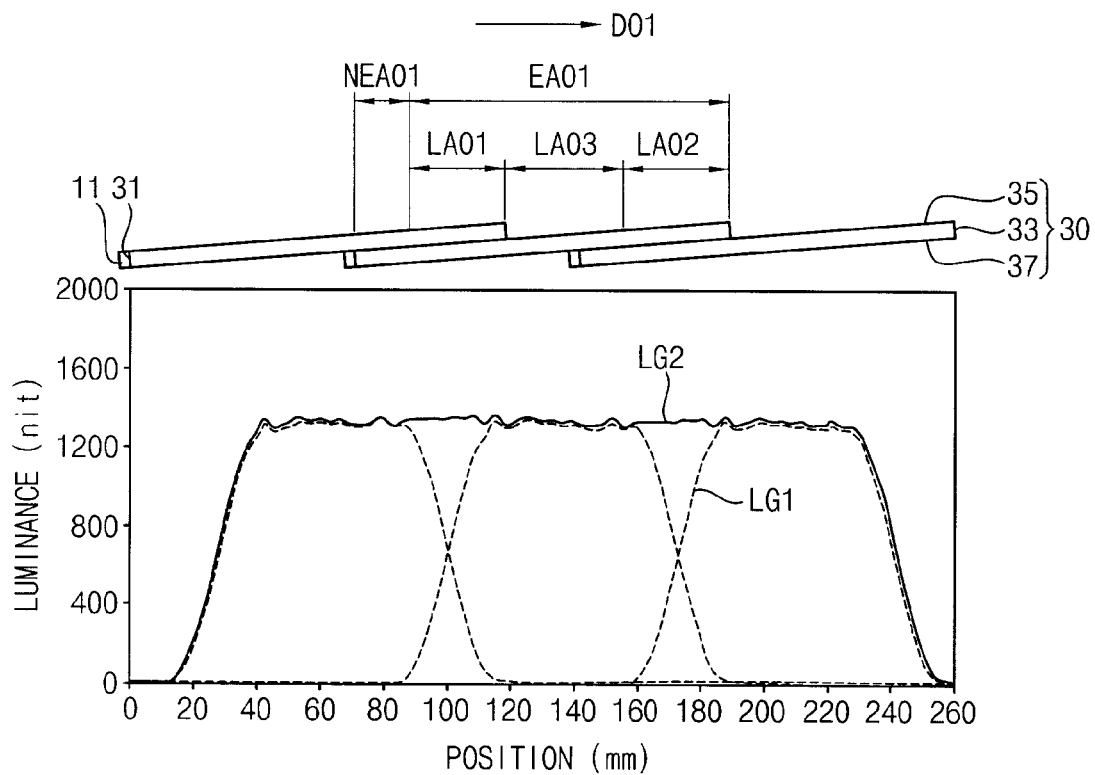
FIG. 6 is a graph showing an exemplary embodiment of a light emitting profile of emitting light, according to positions in the BLU in FIG. 2.

FIG. 6 is a graph showing an exemplary embodiment of a light emitting profile of emitting light according to positions in the BLU 105 in FIG. 2.

A vertical axis indicates the luminance of the BLU 105 and a horizontal axis indicates positions in the LGP 30 array, in FIG. 6. A distance between the light incident surface 31 and the counter surface 33 of an LGP 30 is about 120 mm in FIG. 6. Each of dotted line curves in FIG. 6 illustrates a light emitting profile of each of the LGPs 30, and is defined as a first luminance graph LG1. A solid line curve illustrates the luminance of the BLU 105, and is defined as a second luminance graph LG2.

Referring to FIG. 6, the first luminance graph LG1 of the LGPs 30 shows that the light emitting surface 35 corresponding to the third area has substantially the uniform luminance, the light emitting surface 35 corresponding to the first area LA01 has the luminance rapidly increased to reach the uniform luminance as the distance from the light incident surface 31 is increased, and the light emitting surface 35 corresponding to the second area LA02 has the luminance rapidly decreased from the uniform luminance as the distance from the light incident surface 31 is increased and as the distance from the counter surface 33 is decreased. When the BLU 105 according to the illustrated exemplary embodiment is compared with a BLU 105 having the light emitting profile uniform in an entire ineffective light emitting area, the light leaking into the counter surface 33 is advantageously decreased in the BLU 105 according to the illustrated exemplary embodiment.

As described above, the LGPs 30 adjacent to each other overlap with each other in the first and second areas LA01 and LA02, except the first and second areas LA01 and LA02 of the leftmost and rightmost end portions of the LGP 30 array. The first luminance graph LG1 corresponding to the first area LA01 of the lower LGP 30 and the second area LA02 of the upper LGP 30 are integrated with each other to form an actual luminance graph of the light emitting surface 35 corresponding to the overlapped area. The overlapped area has the luminance substantially the same as that of the light emitting surface 35 corresponding to the third area as illustrated in FIG. 6. Advantageously, the BLU 105 has substantially the uniform luminance in a whole of the light emitting surface 35 except for the first and second areas LA01 and LA02 of the leftmost and rightmost end portions of the LGP 30 array, as illustrated by the second luminance graph LG2 in FIG. 6.

Referring again to FIG. 2, the BLU 105 further includes the reflection sheet 57. The reflection sheet 57 is disposed between the bottom plate 41 and the rear surface 37 of the LGP 30. The reflection sheet 57 is a single and continuous member of the BLU 105. Alternatively, the reflection sheet 57 may be disposed between the bottom plate 41 and the reflection cover 15. The reflection sheet 57 is disposed corresponding to a plurality of the LGPs 30, such that the reflection sheet 57 overlaps an entire of the LGPs 30 in the array. Alternatively, the reflection sheet 57 may be a plurality of discrete reflection members each disposed corresponding to an LGP 30 of the plurality of LGPs 30, so that an end portion of the reflection sheet 57 may be inserted between the rear surface 37 and the reflection cover 15.

Referring to FIGS. 2 and 4, the optical sheets 50 are supported by a stepped portion 47 of the side wall 43 of the receiving container 40. The optical sheets 50 include a light diffusion sheet 51, and light condensing sheets 53 and 55 disposed on the light diffusion sheet 51. The number of the light diffusion sheet 51 and the light condensing sheets 53 and 55 may change according to light emitting conditions of the BLU 105. Alternatively, the optical sheets 50 may further include a light diffusion plate (not shown) or reflection-polarization sheet (not shown).

The display apparatus 100 further includes a middle frame 60 combined with the receiving container 40, and pressing a side of the optical sheets 50.

The display panel 70 is disposed on a stepped portion disposed on the middle frame 60. The display panel 70 includes an array substrate 71 including pixels, a counter substrate 75 including color filters and a liquid crystal layer (not shown) disposed between the array substrate 71 and the counter substrate 75.

The display apparatus 100 further includes a driving part 79. The driving part 79 is physically and electrically connected with the display panel 70 through a signal transmittance film 77. The driving part 79 may provide driving signals driving the display panel 70 and control signals controlling the light source 10. The driving part 79 applies the control signals to the LEDs 11 through the power transmitting film 13 of the light source 10.

In the illustrated exemplary embodiment, the light source 10 includes the LED 11. The driving part 79 generates the control signals corresponding to images displayed in a display area of the display panel 70, so that the display apparatus 100 drives the light source 10 through two-dimensional ("2D") local dimming method or three-way local dimming method. In one exemplary embodiment, when the LED 11 is a white LED 11, 2D local dimming method may be applied to the light source 10, so that the luminance of each of the LEDs 11 may be adjusted to display the images. When the LED 11 is a RGB LED 11 emitting red, green and blue lights, the away local dimming method may be applied to the light source 10, so that the luminance and color of each of the LEDs 11 may be adjusted to display the images. Alternatively, when the light source 10 includes a cold cathode florescent lamp ("CCFL"), the 2D local dimming method may be applied to the light source 10.

The display apparatus 100 further includes a top chassis 80. The top chassis 80 is combined with the receiving container 40 to expose the display area of the display panel 70.

Figure 7:
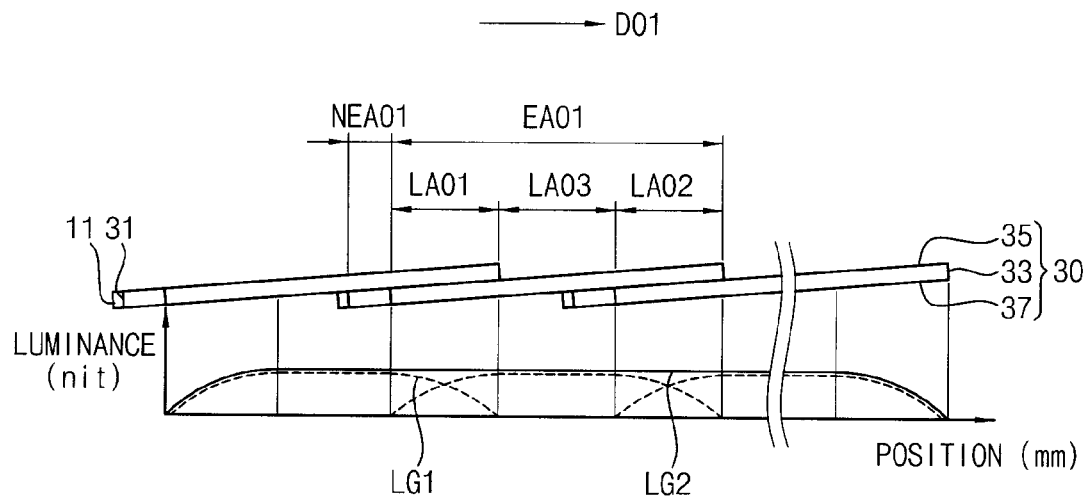
FIG. 7 is a graph showing an exemplary embodiment of a light emitting profile of emitting light in ideal conditions of the BLU in FIG. 2.

FIG. 7 is a graph showing an exemplary embodiment of the light emitting profile of the emitting light in ideal conditions of the BLU 105 in FIG. 2.

Referring to FIG. 7, the effective light emitting area EA01 of the LGP 30 is defined as a unit block in FIG. 7. The first luminance graph LG1 in FIG. 7 shows simulated results in the ideal conditions. As described above, the first luminance graph LG1 of the unit block is bilaterally symmetric. The first luminance graphs LG1 are integrated with each other to form the second luminance graph LG2 for the BLU 105. The second luminance graph LG2 shows the substantially uniform luminance except the leftmost and rightmost end areas of the LGP 30 array.

Figure 8:
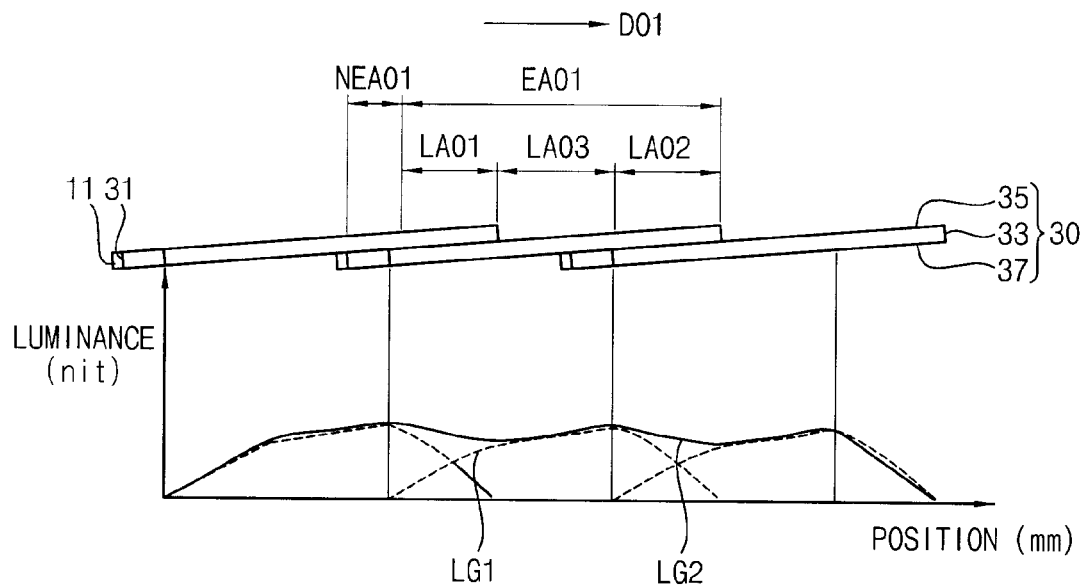
FIG. 8 is an exemplary embodiment of a second luminance graph for the BLU in FIG. 2 when a first luminance graph in each LGP is asymmetrical.
Figure 9:
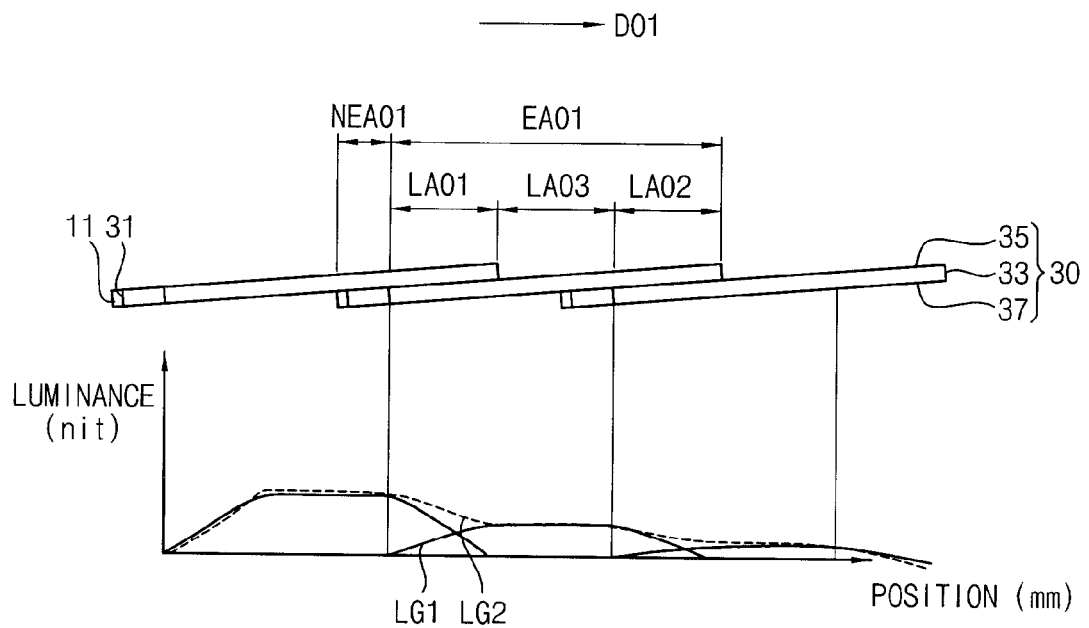
FIG. 9 is an exemplary embodiment of a second luminance graph for the BLU in FIG. 2 when light emitting diodes ("LEDs") in each LGP are independently dimmed.

FIG. 8 illustrates an exemplary embodiment of a second luminance graph LG2 of the BLU 105 in FIG. 2, when each first luminance graph LG1 is asymmetrical. FIG. 9 is an exemplary embodiment of a second luminance graph LG2 of the BLU 105 in FIG. 2, when LEDs in each LGP 11 are independently dimmed.

Unstable factors decreasing the overall luminance uniformity of the BLU 105, such as assembly tolerance in arranging the LGPs 30 overlapping with each other, the light leakage into the counter surface 33 and asymmetry of the light emitting profile of the unit block, may be present in driving conditions of the BLU 105. The unstable factors may undesirably decrease the overall luminance uniformity of the BLU 105 at positions corresponding to the counter surface 33 of the LGPs 30, as illustrated in FIG. 8. In addition, when the 2D local dimming is applied to the BLU 105 and thus the luminance of LEDs 11 in each LGP 30 are independently dimmed, the second luminance graph LG2 may have a stepped shape at the positions corresponding to the counter surface 33, so that the profile of the LGP 30 may be recognized, as illustrated in FIG. 9.

According to the illustrated exemplary embodiment of the present invention, the LGPs 30 partially overlap with each other as described above, so that the luminance uniformity of the BLU 105 is increased in spite of the unstable factors. As illustrated in FIG. 8, each LGP 30 has the first luminance graph LG1 being asymmetric, however, the BLU 105 has the second luminance graph LG2 formed by the integration of the first luminance graphs LG1. Advantageously, the asymmetry of the overall luminance of the BLU 105 is decreased, the BLU 105 has substantially the uniform luminance in spite of minute fluctuation in the luminance, and the minute fluctuation is removed by the optical sheets 50.

Figure 10:
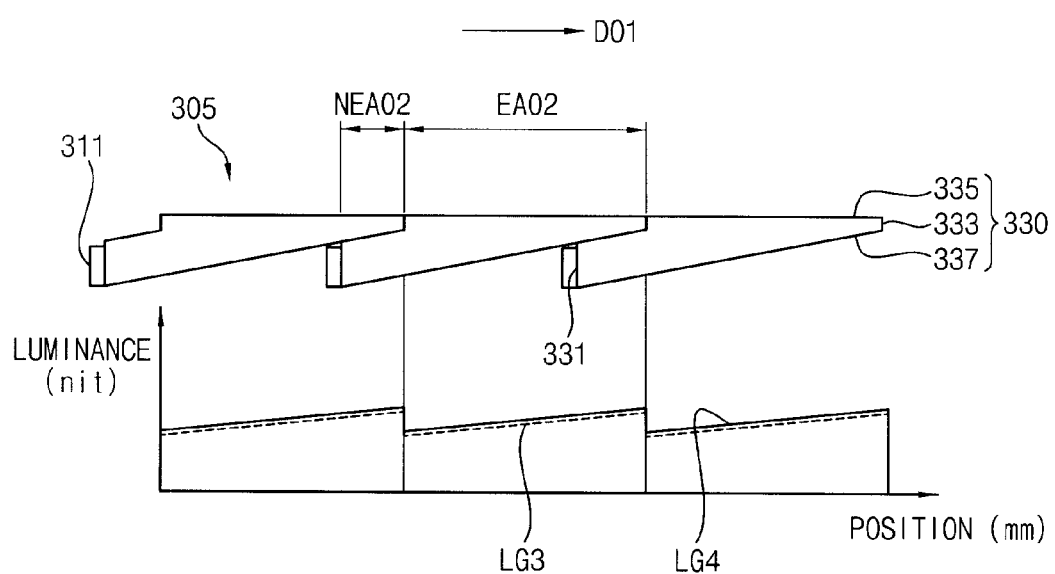
FIG. 10 is a graph illustrating luminance of a BLU having a tandem type configuration.
Figure 11:
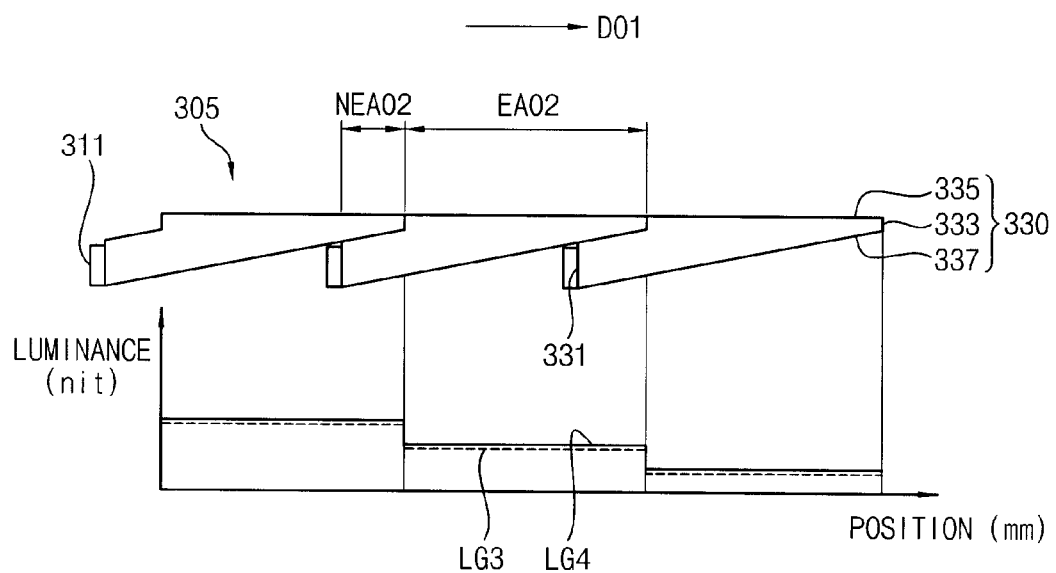
FIG. 11 is a graph illustrating the luminance of the BLU in FIG. 10 when LEDs in each LGP are independently dimmed.

FIG. 10 is a graph illustrating luminance of a BLU 305 having a tandem type configuration. FIG. 11 is a graph illustrating the luminance of the BLU 305 in FIG. 10, when LEDs in each LGP 330 are independently dimmed.

Referring to FIGS. 10 and 11, a stepped portion is disposed in each ineffective light emitting area NEA02 of the LGPs 330 in the tandem type BLU 305. An end portion of the counter surface 333 of a first LGP 330 is disposed at the stepped portion of a second LGP 330 adjacent to the first LGP 330 along the first direction D01. The light emitting surfaces 335 of the tandem type BLU 305 are disposed coplanar with each other, such as to form a continuous light emitting surface of the BLU 305. The effective light emitting areas EA02 of the LGPs 330 in the tandem type BLU 305 do not overlap with each other in the exemplary embodiment illustrated in FIGS. 10 and 11 different from the exemplary embodiment described referring to FIGS. 1 to 9. In addition, the LGP 330 of the tandem type BLU 305 does not include the light diffusion pattern of the exemplary embodiment described referring to FIGS. 1 to 9.

Each of dotted line curves in FIGS. 10 and 11 illustrates a light emitting profile of each of the LGPs 330, and is defined as a third luminance graph LG3. When a local dimming method is applied to the tandem type BLU 305, a fourth luminance graph LG4 for the tandem type BLU 305 has a stepped shape at the positions corresponding to the counter surface 333 as illustrated in FIGS. 10 and 11. The stepped shape of the fourth luminance graph LG4 is hardly removed in spite of using the optical sheets to decrease the luminance uniformity of the tandem type BLU 305.

Figure 12:
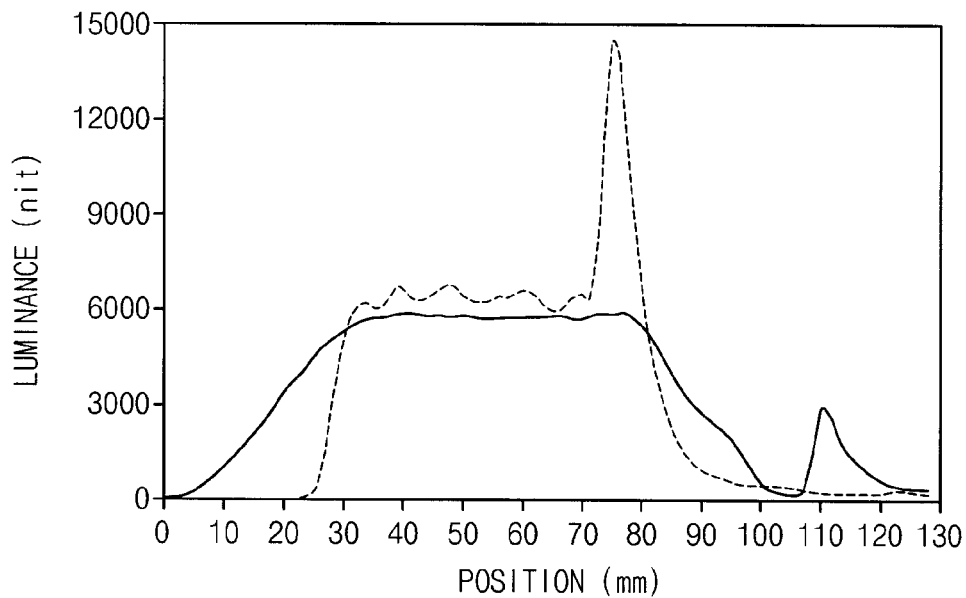
FIGS. 12 and 13 are graphs each illustrating light leaking into a counter surface of the LGP of the tandem type BLU in FIG. 10, and the light leaking into the counter surface of the LGP of the BLU according to the exemplary embodiment in FIGS. 1 to 9.
Figure 13:
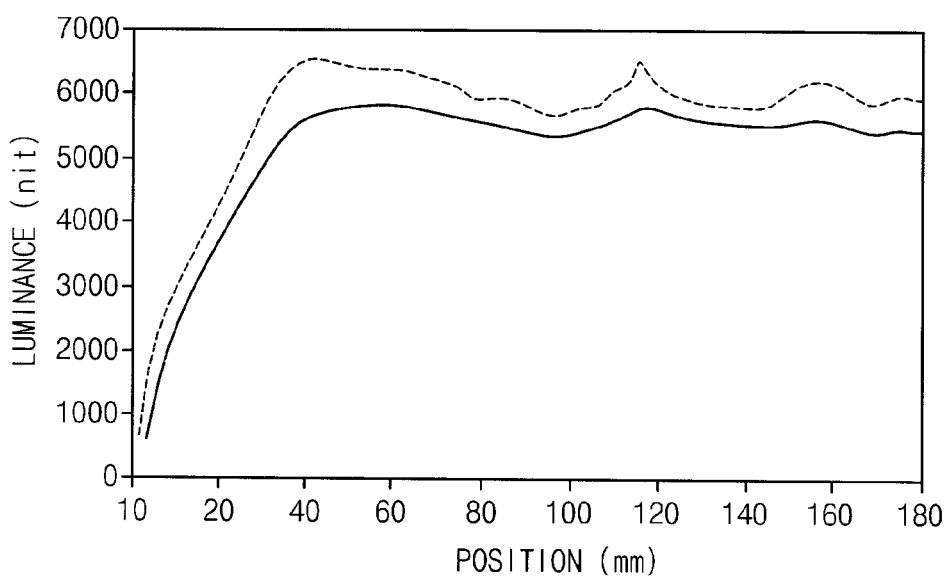

FIGS. 12 and 13 are graphs each illustrating both light leaking into the counter surface 333 of the LGP 330 of the tandem type BLU 305, and the light leaking into the counter surface 33 of the LGP 30 of the BLU 105 according to the exemplary embodiment in FIGS. 1 to 9. A dotted curve indicates the LGP 330 of the tandem type BLU 305 in FIG. 10, while the solid curve indicates the LGP 30 of the BLU 105 in FIGS. 1 to 9.

A vertical axis in FIGS. 12 and 13 indicates luminance and a horizontal axis indicates position in the effective light emitting area EA01 and EA02, respectively. Curves in FIG. 12 show light emitting profile of a single LGP. Curves in FIG. 13 show light emitting profile of the BLU when two LGPs partially overlap with each other.

Referring to FIG. 12, as described above, the tandem type BLU 305 has the substantial uniform luminance in the effective light emitting area because the LGP 330 does not include the light diffusion pattern on the rear surface 337. As the luminance is not rapidly decreased as a distance from the counter surface 333 is decreased, the light leaking into the counter surface 333 of the BLU 305 (dotted line) is larger than that of the BLU 105 of the exemplary embodiment in FIGS. 1 to 9 (solid line). The dotted line for the LGP 330 of the tandem type BLU 305 in FIG. 12 has a luminance peak substantially corresponding to a position of the counter surface 333, so that the dotted line shows considerable amount of the light leaking into the counter surface 333.

However, a solid line for the LGP 30 of the BLU 105 of the exemplary embodiment in FIGS. 1 to 9 shows the light emitting profile which is rapidly decreased as the distance from the counter surface 33 is decreased, so that the light leaking into the counter surface 33 is rapidly decreased and the luminance peak corresponding to the counter surface 33 is rapidly decreased. For example, the amount of the light leaking into the counter surface 33 is no more than about 10% of the amount of the light incident into the light incident surface 31. In addition, when the optical sheets 50 includes two light diffusion sheets 51 and two prism sheets, the decreased luminance peak is reduced considerably, and becomes negligible. Further, when the LGP 30 includes light diffusion substance disposed within the LGP 30, bright lines are more effectively removed from the BLU 105.

According to the exemplary embodiment described referring to FIGS. 1 to 9, the LGPs 30 in an array are disposed adjacent to each other, disposed partially overlapping with each other and disposed under (e.g., overlapping) the display panel 70, so that an overall thickness of the display apparatus 100 having a relatively large (planar) size is advantageously decreased, while the luminance uniformity of the BLU 105 is increased to improve display quality of the display apparatus 100.

Figure 14:
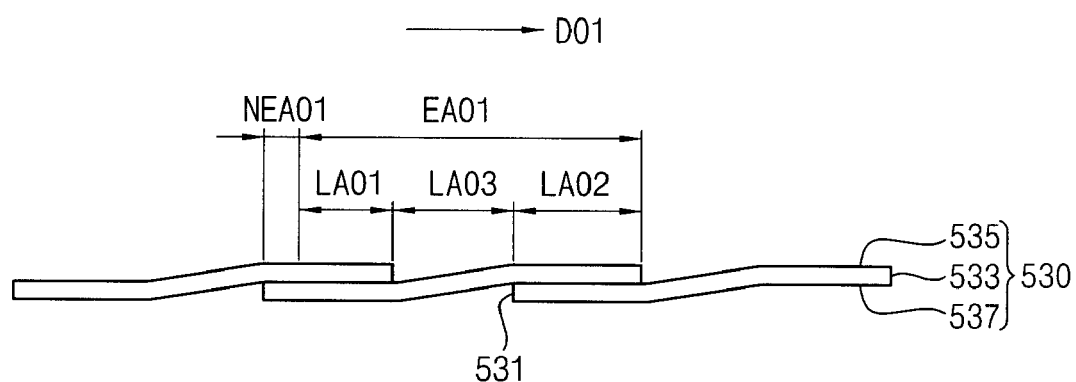
FIG. 14 is a cross-sectional view illustrating another exemplary embodiment of a BLU according to the present invention.

FIG. 14 is a cross-sectional view illustrating another exemplary embodiment of a BLU according to the present invention.

Referring to FIG. 14, a BLU and a display apparatus is substantially the same as the BLU 105 and the display apparatus 100 according to the exemplary embodiment illustrated in FIGS. 1 to 7, except that the LGP 530 is partially bent. Thus, further descriptions of the BLU and the display apparatus according to the illustrated exemplary embodiment will be omitted.

The LGP 530 includes a light incident surface 531, a counter surface 533 disposed opposite to and facing the light incident surface 531, a light emitting surface 535 disposed facing and overlapping the display panel, and a rear surface 537 disposed opposite to and facing the light emitting surface 535. The light incident surface 531 and the counter surface 533 connect the light emitting surface 535 with the rear surface 537 which are disposed opposite to each other.

In the illustrated exemplary embodiment, the LGP 530 has substantially a uniform thickness taken in a direction substantially perpendicular to a plane of each portion of the LGP 530. An ineffective light emitting area NEA01, a first area LA01 of the LGPs 530 and a second area LA02 of the LGPs 530 are disposed substantially parallel with each other, and disposed substantially parallel with a bottom plate of a receiving container. The second area LA02 of a first (upper) LGP 530 is disposed over the first area LA01 of a second (lower) LGP 530 adjacent to the first LGP 530 along the first direction D01. For each LGP 530, the first area LA01 is closer to the bottom plate of the receiving container than the second area LA02.

A third area LA03 connects the first area LA01 with the second area LA02, and is inclined with respect to a plane of the first and second areas LA01 and LA02. As the first area LA01 and the second area LA02 are each substantially parallel with the bottom plate of the receiving container, an overall thickness of the BLU and the display apparatus according to the illustrated exemplary embodiment in FIG. 14 may be advantageously thinner that of the exemplary embodiments in FIGS. 1 to 13.

Figure 15:
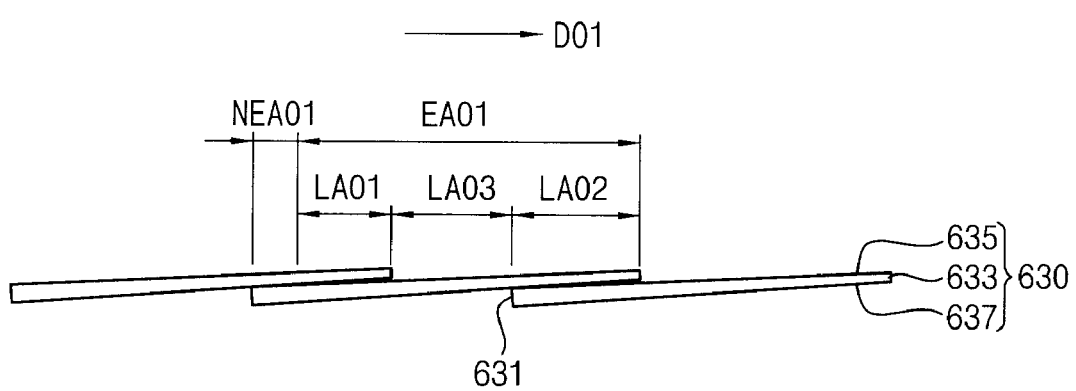
FIG. 15 is a cross-sectional view illustrating another exemplary embodiment of a BLU according to the present invention.

FIG. 15 is a cross-sectional view illustrating another exemplary embodiment of a BLU according to the present invention.

Referring to FIG. 15, a BLU and a display apparatus is substantially the same as the BLU 105 and the display apparatus 100 according to the exemplary embodiment illustrated in FIGS. 1 to 7, except that an LGP 630 has a wedge shape. Thus, further descriptions of the BLU and the display apparatus according to the illustrated exemplary embodiment will be omitted.

The LGP 630 includes a light incident surface 631, a counter surface 633 disposed opposite to and facing the light incident surface 631, a light emitting surface 635 disposed facing and overlapping the display panel, and a rear surface 637 disposed opposite to and facing the light emitting surface 635. The light incident surface 631 and the counter surface 633 connect the light emitting surface 635 with the rear surface 637 which are disposed opposite to each other.

In the illustrated exemplary embodiment, the LGP 630 has the wedge shape, so that a thickness of the LGP 630 is decreased along the first direction D01 taken from a light incident surface 631 toward a counter surface 633. As the thickness of the LGP 630 at the light incident surface 631 is larger than a thickness at the counter surface 633, an overall thickness of the BLU in an overlapped area of the first and second areas LA01 and LA02 is decreased. Advantageously, the thickness of the BLU and the display apparatus according to the illustrated exemplary embodiment may be thinner that of the exemplary embodiment in FIGS. 1 to 13.

Figure 16:
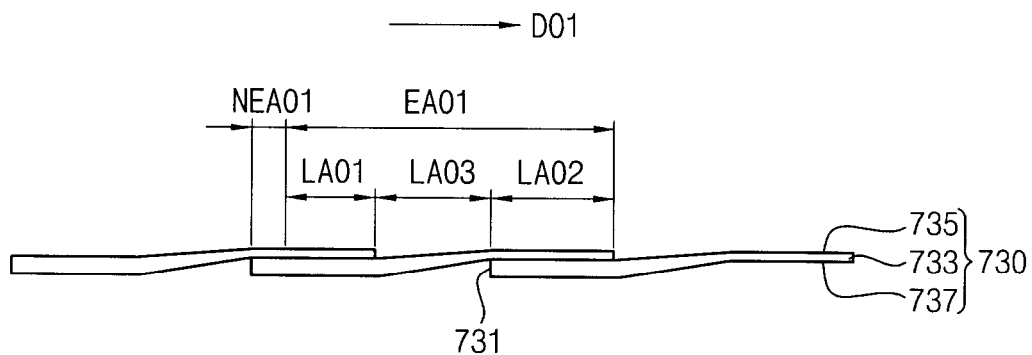
FIG. 16 is a cross-sectional view illustrating another exemplary embodiment of a BLU according to the present invention.

FIG. 16 is a cross-sectional view illustrating another exemplary embodiment of a BLU according to the present invention.

Referring to FIG. 16, a BLU and a display apparatus is substantially the same as the BLU 105 and the display apparatus 100 according to the exemplary embodiment illustrated in FIGS. 1 to 7, except that an LGP 730 has both a wedge shape and is partially bent. Thus, further descriptions of the BLU and the display apparatus according to the illustrated exemplary embodiment will be omitted.

The LGP 730 includes a light incident surface 731, a counter surface 733 disposed opposite to and facing the light incident surface 731, a light emitting surface 735 disposed facing and overlapping the display panel, and a rear surface 737 disposed opposite to and facing the light emitting surface 735. The light incident surface 731 and the counter surface 733 connect the light emitting surface 735 with the rear surface 737 which are disposed opposite to each other.

In the illustrated exemplary embodiment, the LGP 730 has the wedge shape, so that a thickness of the LGP 730 is decreased along the first direction D01 taken from the light incident surface 731 toward the counter surface 733. The thickness of the LGP 730 at the light incident surface 731 is larger than that at the counter surface 733. An ineffective light emitting area NEA01, a first area LA01 and a second area LA02 are disposed substantially parallel with each other and disposed substantially parallel with a bottom plate of a receiving container. The second area LA02 of a first (upper) LGP 730 is disposed over the first area LA01 of a second (lower) LGP 730 adjacent to the first LGP 730 along the first direction D01. For each LGP 730, the first area LA01 is closer to the bottom plate than the second area LA02.

A third area LA03 connects the first area LA01 with the second area LA02, and is inclined with respect to a plane of the first and second areas LA01 and LA02. As the first and second areas LA01 and LA02 are substantially parallel with the bottom plate of the receiving container, and the LGP 730 has the wedge shape, an overall thickness of the BLU and the display apparatus may be advantageously thinner than that of the exemplary embodiment in FIGS. 1 to 13.

Figure 17:
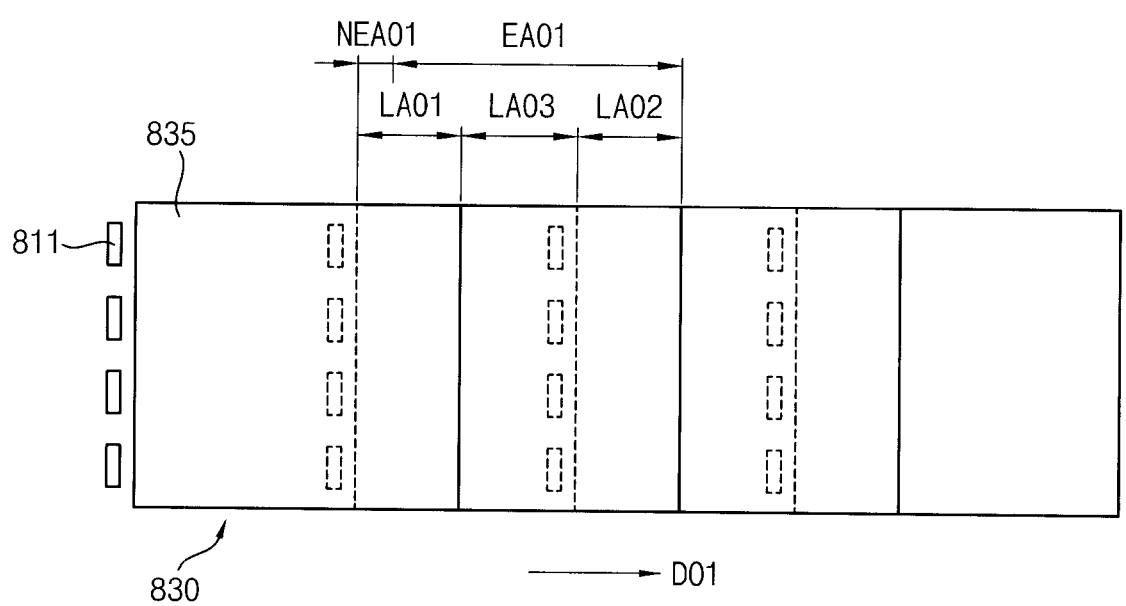
FIG. 17 is a plan view illustrating another exemplary embodiment of a BLU according to the present invention.
Figure 18:
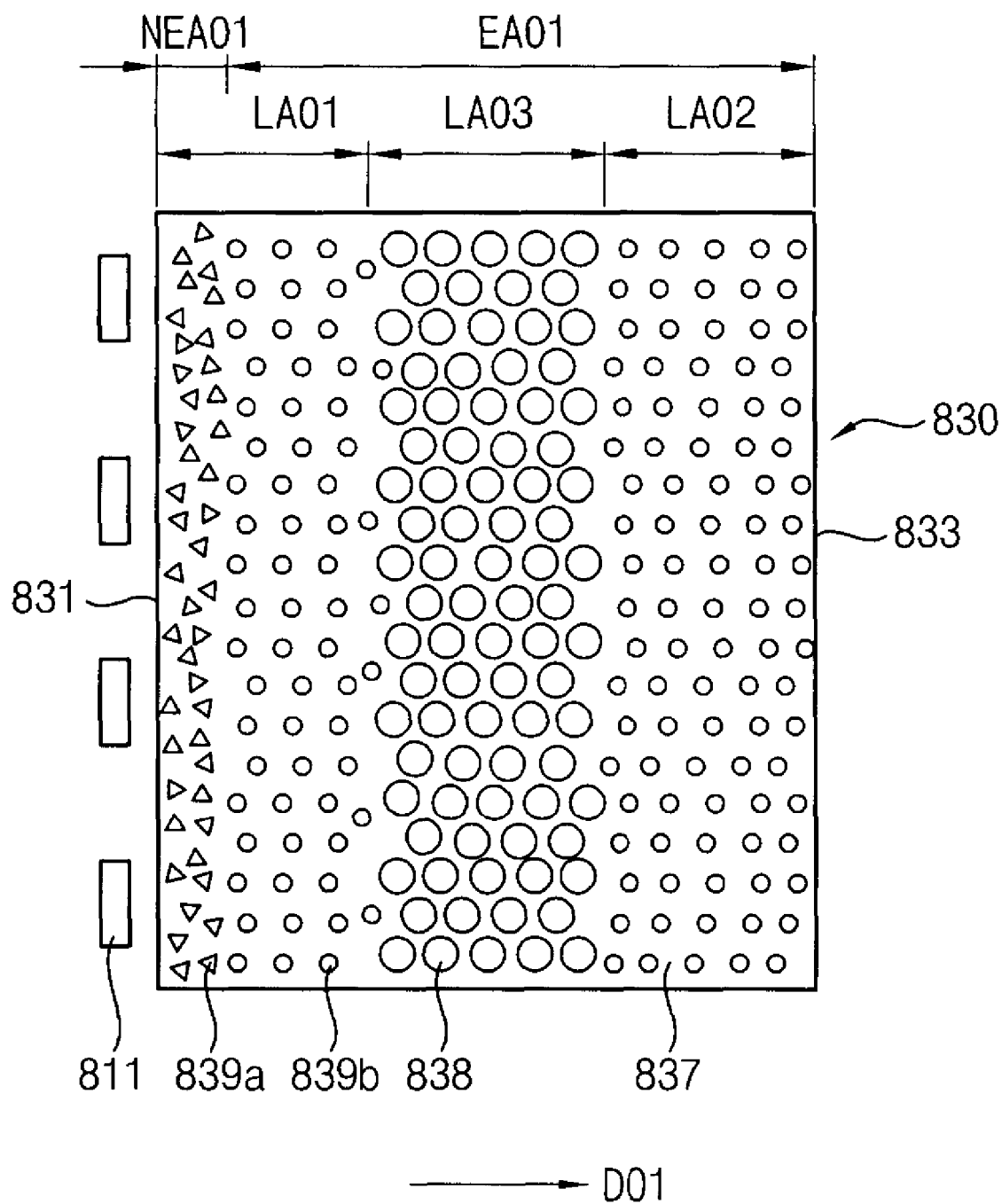
FIG. 18 is a plan view illustrating an exemplary embodiment of the rear surface 837 of the LGP 830 in FIG. 17.

FIG. 17 is a plan view illustrating another exemplary embodiment of a BLU according to the present invention. FIG. 18 is a plan view illustrating an exemplary embodiment of the rear surface 837 of the LGP 830 in FIG. 17.

Referring to FIGS. 17 and 18, a BLU and a display apparatus is substantially the same as the BLU 105 and the display apparatus 100 according to the exemplary embodiment illustrated in FIGS. 1 to 7, except that a rear surface of a LGP 830 dose not include a dead area. Thus, further descriptions of the BLU and the display apparatus according to the illustrated exemplary embodiment will be omitted.

The LGP 830 includes a light incident surface 831, a counter surface 833 disposed opposite to and facing the light incident surface 831, a light emitting surface 835 disposed facing and overlapping the display panel, and a rear surface 837 disposed opposite to and facing the light emitting surface 835. The light incident surface 831 and the counter surface 833 connect the light emitting surface 835 with the rear surface 837 which are disposed opposite to each other.

In the illustrated exemplary embodiment, the rear surface 837 has first, second and third areas LA01, LA02 and LA03. The first area LA01 is directly connected with an edge of the light incident surface 831, so that the rear surface 837 does not include a dead area, which is different from the previous exemplary embodiment illustrated in FIGS. 1 to 7. Thus, length of the LGP 830 along a first direction D01 is decreased. The second area LA02 is connected with the counter surface 833. The third area LA03 connects the first area LA01 with the second area LA02.

A light diffusion pattern formed on the first area LA01 includes first and second light diffusion patterns 839a and 839b which may include different or substantially the same density and shape. The first light diffusion pattern 839a is formed adjacent to the light incident surface 831 and corresponds to the ineffective light emitting area NEA01. The second light diffusion pattern 839b is formed adjacent to the third area LA03.

In exemplary embodiments of the present invention, the plurality of the LGPs disposed adjacent to each other partially overlap with each other, and the plurality of the LGPs is disposed under and overlapping the display panel, so that the display apparatus having the relatively large size is effectively formed with a minimized thickness. In addition, the LGP is used, so that a distance between an optical sheet and the LGP to emit surface light is decreased, which minimizes the thickness of the display apparatus. Advantageously, the present invention including the plurality of the LGPs disposed adjacent to each other, partially overlapping with each other, under and overlapping the display panel, may be used for a display apparatus having the large size, such as a television.

The foregoing is illustrative and is not to be construed as limiting of the teachings provided herein. Although exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the present teachings. In the below claims, means-plus-function clauses are intended to cover the structures described herein as performing the recited function and not only structural equivalents but also functionally equivalent structures. Therefore, it is to be understood that the foregoing is illustrative and is not to be construed as limited to the specific exemplary embodiments disclosed, and that modifications to the disclosed exemplary embodiments, as well as other exemplary embodiments, are intended to be included within the scope of the teachings.

What is claimed is:

1. A display apparatus comprising:
    a display panel which displays an image;
    a light source which generates and emits light used by the display panel to display the image; and
    a plurality of light guiding plates each including:
        a light incident surface facing the light source, the light emitted from the light source being incident on the light incident surface;
        a counter surface disposed facing the light incident surface;
        a light emitting surface facing a rear surface of the display panel and disposed adjacent to the light incident surface, the light emitting surface including an ineffective light emitting area adjacent to the light incident surface and an effective light emitting area connecting the ineffective light emitting area with the counter surface;

the rear surface of a first light guiding plate of the plurality of light guiding plates partially overlaps with the effective light emitting area of a second light guiding plate, and a light guiding plate array arranged along a first direction includes the first light guiding plate and the second light guiding plate disposed adjacent to each other and partially overlapped with an end portion of each, wherein a rear surface of the light guiding plate array further comprises;

a first area corresponding to the effective light emitting area in which the LGPs overlap with each other excepting for the ineffective light emitting area, the first area being adjacent to the light incident surface, a light diffusion pattern being formed in the first area;

a second area corresponding to the effective light emitting area in which the LGPs overlap with each other, the second area being adjacent to the counter surface, the light diffusion pattern being formed in the second area; and a third area connecting the first area with the second area, the light diffusion pattern being formed in the third area, density of the light diffusion pattern in the third area being higher than that in the first and second areas.

2. The display apparatus of claim 1, wherein the first area is spaced apart from an edge of the light incident surface, the rear surface further comprises a dead area which connects the first area with the edge of the light incident surface.

3. The display apparatus of claim 1, wherein the first area is directly connected with the edge of the light incident surface, and the light diffusion pattern formed on the first area comprises a first light diffusion pattern adjacent to the light incident surface and a second light diffusion pattern adjacent to the third area.

4. The display apparatus of claim 1, wherein the light diffusing pattern includes at least one of a printed dot on the rear surface or a groove and a protrusion disposed on the rear surface.

5. The display apparatus of claim 4, wherein the light guiding plate includes light diffusion substance distributed inside of the light guiding plate.

6. The display apparatus of claim 1, wherein a light emitting profile of the light guiding plate array has a substantially uniform luminance in the effective light emitting area, has the luminance increased to reach the uniform luminance in the first area of a first end portion of the light guiding plate array as a distance from the light incident surface of the first end portion is increased, and has the luminance decreased from the uniform luminance in the second area of a second end portion of the light guiding plate array as the distance to the counter surface of the second end portion is decreased, wherein a portion of a single light guiding plate is disposed in the first area of the first end portion of the light guiding plate array, and a portion of the single light guiding plate is disposed in the second area of the second end portion of the light guiding plate array opposite to the first end portion.

7. The display apparatus of claim 6, a light emitting profile of each light guiding plate has substantially uniform luminance in the third area, has the luminance increased to reach the uniform luminance in the first area as the distance from the light incident surface is increased, and has the luminance decreased from the uniform luminance in the second area as the distance to the counter surface is decreased.

8. The display apparatus of claim 7, wherein an amount of the light leaking into the counter surface is no more than about 10% of the amount of the light incident on the light incident surface.

9. The display apparatus of claim 6, further comprising a reflection cover partially surrounding the light source, and overlapping the ineffective light emitting area and the rear surface of each light guiding plate.

10. The display apparatus of claim 9, wherein the light source comprises:

a plurality of light emitting diodes disposed between the reflection cover and the light incident surface; and a power transmitting film disposed on the reflection cover, the light emitting diodes being mounted on the power transmitting film.

11. The display apparatus of claim 10, further comprising a dimming driving part controlling the luminance and color of the light passing through the light guiding plate so that the luminance and the color of the image displayed on the display panel may be adjusted.

12. The display apparatus of claim 10, further comprising an optical sheet disposed between the light guiding plate and the display panel.

13. The display apparatus of claim 9, further comprising a receiving container including a bottom plate to which the reflection cover is fixed, and a side wall including a fixing protrusion overlapping the light emitting surface of the light guiding plate.

14. The display apparatus of claim 13, further comprising a reflection sheet disposed between the reflection cover and the bottom plate.

15. The display apparatus of claim 1, wherein the light guiding plate has a substantially uniform thickness, and the first, second and third areas of the light guiding plate are substantially parallel with each other so that the light guiding plate has a substantially flat plate shape.

16. The display apparatus of claim 1, wherein the light guiding plate has a substantially uniform thickness, the first and second areas of the light guiding plate are substantially parallel with each other, and the third area is inclined with respect to the first and second areas.

17. The display apparatus of claim 1, wherein the light guiding plate has a wedge shape so that a thickness of the light guiding plate is decreased along the first direction from the light incident surface toward the counter surface, and the first, second and third areas of the light guiding plate are substantially parallel with each other so that the rear surface of the light guiding plate has a substantially flat plate shape.

18. The display apparatus of claim 1, wherein the light guiding plate has a wedge shape so that a thickness of the light guiding plate is decreased along the first direction from the light incident surface toward the counter surface, the first and second areas of the light guiding plate are substantially parallel with each other, and the third area is inclined with respect to the first and second areas.

19. The display apparatus of claim 1, further comprising a receiving container including a bottom plate and a side wall, the light guide plates being disposed within the receiving container, wherein the light incident surface is closer to the bottom plate than the counter surface.

* * * * *